Oct. 27, 1925. 1,559,442
R. H. LACY
EMERGENCY REPAIR PATCH FOR HOSE AND PIPES
Filed Jan. 4, 1924
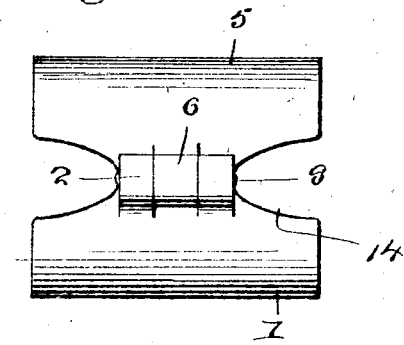
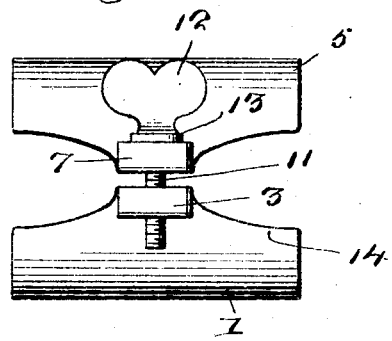
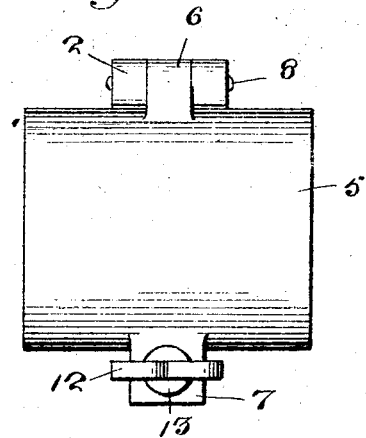
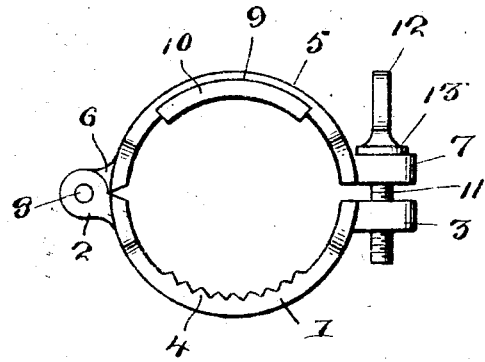
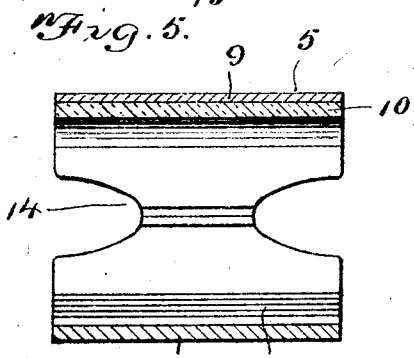
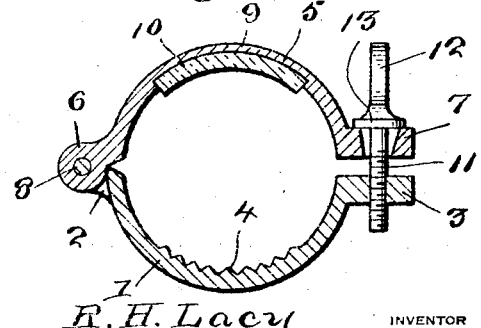

Patented Oct. 27, 1925.

UNITED STATES PATENT OFFICE.

ROBERT H. LACY, OF RICHMOND, VIRGINIA.

EMERGENCY REPAIR PATCH FOR HOSE AND PIPES.

Application filed January 4, 1924. Serial No. 684,377.

*To all whom it may concern:*

Be it known that I, ROBERT H. LACY, a citizen of the United States, residing at Richmond, in the county of Henrico and State of Virginia, have invented new and useful Improvements in Emergency Repair Patches for Hose and Pipes, of which the following is a specification.

The object of my said invention is the provision of a simple and inexpensive, efficient, and quickly and easily applied patch for adequately repairing fractured hose and pipes and particularly air hose such as used in railroad equipment.

To the attainment of the foregoing, the invention consists in the improvement as hereinafter described and definitely claimed.

In the accompanying drawings, forming part of this specification:—

Figure 1 is a side elevation showing the hinge side of my novel patch device.

Figure 2 is a side elevation illustrating the opposite side of the device.

Figure 3 is a side elevation taken at right angles to Figures 1 and 2.

Figure 4 is an end elevation of the device.

Figure 5 is a longitudinal central section of the device.

Figure 6 is a transverse central section of the device.

Similar numerals of reference designate corresponding parts in all of the views of the drawings.

Among other elements my novel patch device comprises a clamp body of metal. This body is made up of a metallic member 1, curvilinear in cross-section and having on one of its edges a pair of spaced apertured lugs 2 and also having on its opposite edge an apertured lug 3 the aperture of which is threaded. Interiorly the said member 1 is provided with longitudinal corrugations 4.

The clamping body also comprises a metallic member 5 curvilinear in cross-section and having the single apertured lug 6 on one edge and an apertured lug 7 on its opposite edge. The said lug 6 is interposed between and pivotally connected to the lugs 2 of the member 1 by a pintle 8. It will also be understood that interiorly the member 5 is provided with a longitudinal recess 9 which extends through the length of the member. In this recess 9 is snugly seated a packing member 10 which may be and preferably is of soft vulcanized rubber though it may be of any other material compatible with its purpose without involving departure from the scope of my invention.

In addition to the elements enumerated my novel patch device comprises a screw 11 the threaded shank of which is passed loosely through the aperture of the lug 7 and engages in the threaded aperture of the lug 3. In addition to the shank referred to the screw 11 has a head 12 with a screw inner portion 13 adapted to bring up against the outer side of the lug 7.

As hereinbefore indicated my novel patch device is designed more particularly for repairing air hose of railway equipment, and in the application of the device over a break or hole in a hose it will be understood that it is simply necessary to open the device and then close it on the air hose so that the packing member 10 is opposed to the break or opening and then turn the screw 11 home until the device is tightly clamped about the hose, when as will be readily observed leakage through the break in the hose will be absolutely prevented and at the same time there will be no liability of the repair device becoming casually loose or displaced.

While primarily designed for use on air hose it will be manifest that the device is susceptible of being used to advantage on hose of all kinds as well as on water, gas and other pipes.

In order to permit expansion of the hose in the clamp body of my improvement the opposed edges of the metallic members 1 and 5 are preferably recessed as designated by 14.

Notwithstanding the practical advantages of my novel device it will be readily noted that the same is simple and inexpensive in construction and is well adapted to withstand rough use, it being observable in this connection that the packing member 10 may be readily removed when worn and as readily replaced with a fresh packing member.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

A repair device for hose and the like, comprising two members of curvilinear cross-section, and means for holding the inner concave sides of the said members under pressure against opposite portions of a hose or the like; one of the members having at its inner side a packing pad projecting inwardly from its surface, and the other member having at its inner side a plurality of ribs extending in the direction of its length.

In testimony whereof I affix my signature.

ROBERT H. LACY.